April 19, 1960

G. A. LYON 2,932,884

METHOD OF PROVIDING BOMB HEAD SHELLS WITH DROP RING SOCKETS

Filed March 28, 1955

Inventor
GEORGE ALBERT LYON
by [signature] Attys.

United States Patent Office 2,932,884
Patented Apr. 19, 1960

2,932,884

METHOD OF PROVIDING BOMB HEAD SHELLS WITH DROP RING SOCKETS

George Albert Lyon, Detroit, Mich.

Application March 28, 1955, Serial No. 497,268

5 Claims. (Cl. 29—423)

This invention relates to a socket construction and a method for forming the same on the wall of a bomb or the like.

In the manufacture of sockets such as bomb hanger sockets it is of the greatest importance for reasons of economy and high speed production techniques necessary to meet customer demands that a method of making and assembling of the components of a socket be developed so as to facilitate bomb production on a large scale.

An object of this invention is to provide a novel but simple hanger construction which lends itself to economical manufacture.

Another object of this invention is to provide an economical method of manufacture of bomb hanger sockets which can make use of a projection welding operation.

In accordance with the general features of this invention there is provided in a method of forming a stud-like socket for a cylindrical wall such as that of a bomb or the like, the steps of punching a hole in the wall, dishing the edge portion defining the hole inwardly of the wall, trimming off the inner extremity of the dished portion leaving an annular flange, inserting a combustible plug in said flange in snug telescoping cooperation therewith, applying a flanged cap over the inner end of the plug with its flange snugly engaged therewith and in alignment with and abutting the dished flange, welding the cap to the dished flange and destroying the plug by combustion of the same.

Another feature of the invention relates to the provision of a novel dispensible centering plug for use in welding of aligned parts.

Other objects and features of this invention may more fully appear from the following detailed description taken in connection with the accompanying drawing which illustrates a single embodiment thereof and in which:

Figure 1 is a side view of a bomb having a series of hanger sockets for suspending the bomb from the underside of an airplane or the like;

As shown on the drawing:

Figure 1:
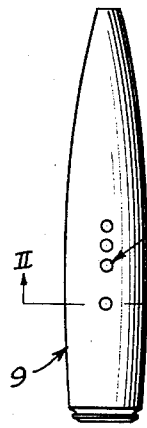
Figure 2:
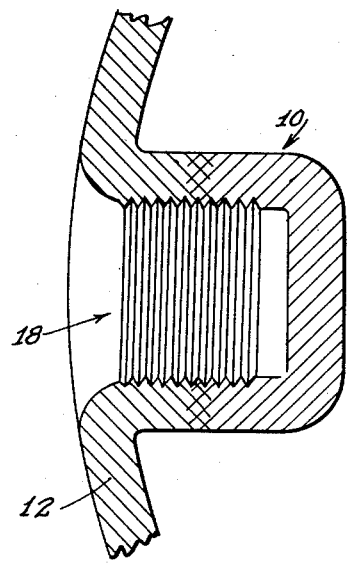
Figure 2 is a fragmentary enlarged cross sectional view of my novel bomb hanger socket taken on the line II—II of Figure 1, and showing one socket secured to the bomb casing ready for use with a bomb hanger.

The numeral 9 indicates generally a tubular bomb shell casing (Figure 1) with my novel stud sockets indicated generally at 10 (Figures 1 and 2) where they have been formed and are carried by the cylindrical wall 12 of the bomb casing 9. While my method is illustrated in connection with a uni-sectional casing it will be appreciated that a multi-sectional casing could be used without departing from my invention. It will of course be understood that after the sockets have been secured to the casing 9 the casing will then be in position for assembly with its other component parts (not shown) namely, a tail assembly, the powder charge, and the detonator assembly.

It is believed that my novel method and apparatus for producing bomb hanger sockets will be best understood from a detailed description taken in connection with the steps in my method of manufacture.

The initial step in my novel method of making bomb hanger sockets is the punching operation in which an aperture or opening 13 of predetermined dimension is formed in the wall 12 at the approximate center of mass of the casing 9. Thereafter the cylindrical wall 12 is suitably deformed or dished inwardly of the wall defining the casing 9 by dies or the like to form an inwardly extending flange 14 terminating in an angled lip or inner extremity 15. It has been found by angling the terminal or lip 15 that the shoulder 16 has the highly advantageous tendency to comprise an even annular surface thereby minimizing any propensity for a ragged shoulder to arise.

It is, of course, preferred that a relatively flat non-ragged annular shoulder 16 be formed which lies substantially in one plane intersecting the wall of the casing 9. This may be best effected by prepunching an oval-shaped aperture (not shown) of predetermined dimension having its major axis extending transversely of the bomb casing 9 so that as the inwardly extending flange 14 is deformed about a given circle in a subsequent operation its annular shoulder 16 will lie in one plane although not of uniform radial dimension. The non-uniformity of the dimension is occasioned since the wall 12 is a curved surface and when uniformly deformed about a circle-like aperture, the flange formed will not have as great a tendency to impart a relatively smooth non-ragged uni-planar annular shoulder 16.

For a further description of my method of forming an annular shoulder which lies substantially in one plane see my patent entitled "Bomb Construction and Method of Making Same," filed February 18, 1955, Serial No. 489,240, Patent No. 2,870,707, granted January 27, 1959.

Figure 3:
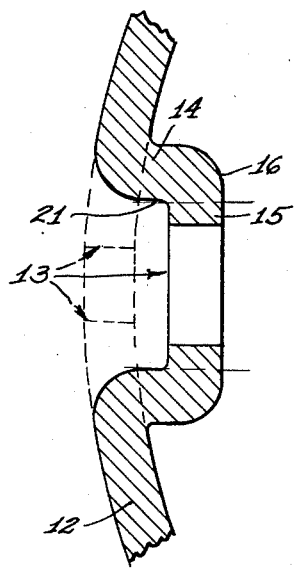
Figure 3 is an enlarged fragmentary cross sectional view similar to Figure 2 only showing in full and dotted lines the initial steps of my novel method.
Figure 4:
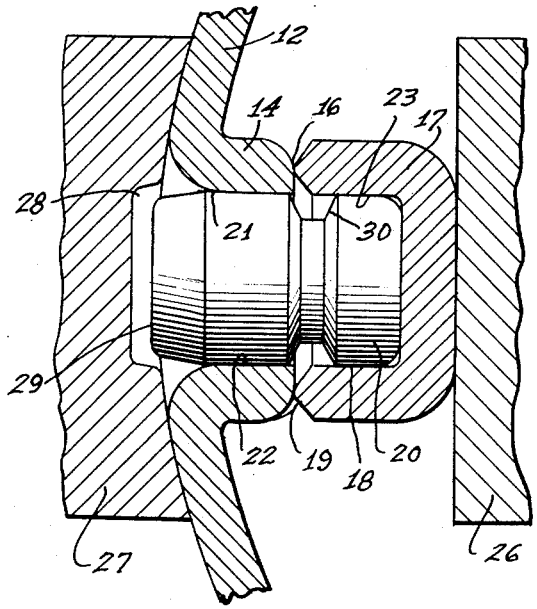
Figure 4 is an enlarged fragmentary cross sectional view with parts in elevation highlighting a subsequent step in my novel method and showing my novel centering plug.
Figure 5:
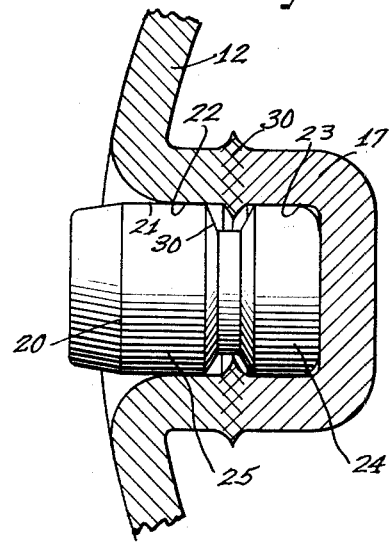
Figure 5 is an enlarged fragmentary cross sectional view partly in elevation illustrating a still later step in my novel method after the cap has been projection welded to form the socket.

The next step in my novel method is the trimming of the lip 15 (Figure 3) so as to effect an opening defined wholly by the flange 14.

The next step in my novel method concerns itself with the attachment of an annular cap 17 to the annular shoulder 16 thereby roughly forming the socket 18 which is defined by the annular flange 14 and the interior wall 18 of the cap 17.

Preferably the annular cap 17 has preformed thereon an annular edge or peak 19 of predetermined dimensions. The peak 19 facilitates the projection welding operation as will hereafter become clear.

In assembling the cap 17 with the shoulder 16, a preferably combustible wooden plug 20 is used as a centering means for aligning the openings defined by the inner surface 21 of the annular flange 14 and the inner wall 18 of the cap 17.

This plug may be made of any suitable heat fugitive material as it is a dispensible element after welding.

The plug has concentric annular surfaces 22 and 23 which are adapted to correspond closely to the size of the openings defined by the annular wall 18 and the annular surface 21.

Thus after the lower end 24 of the plug 20 has been nested within the opening defined by the wall 18 of the cap 17, the assembled parts are moved together with the upper end 25 of the plug 20 being telescoped within the opening defined by the inner surface 21 of flange 14 thereby concentrically aligning the annular wall 18 and the inner surface 21. After the surfaces have been concentrically aligned the annular peak 19 on the cap 17 is brought into abutment with the annular shoulder 16.

Thereafter suitable projection welding electrodes 26 and 27 are brought to bear upon the cap and the wall respectively. It will be noted that the electrode 27 has an opening 28 to accommodate extremity 29 of end plug 25 as the peak 19 is projection welded into the shoulder 16. It will be appreciated that in the projection welding operation that a certain amount of flash 31 will accrue which necessitates the formation of a recess 30 on the plug 20 to accommodate the same.

After the projection welding operation has been completed the wooden plug 20 may be removed in any suitable manner. I have found that when I stress relieve the bomb casing and socket in a furnace of predetermined temperature that the wooden plug is combusted thereby facilitating its removal. It will be appreciated that the flash created during the welding operation interlocks the plug with the welded joint so that the plug can only be removed by destroying same. Thereafter the flash 30 is machined off from the walls of the socket 10.

The interior surface of the socket 10 is then tapped or threaded in order to receive a hanger socket (not shown). It will be noted that not only is the surface 21 threaded but in addition, the annular wall 18 is also threaded. It is in this manner that the hanger element after it has been threaded into the socket continually serves to draw the bonded surfaces together and in that manner strengthens the connection.

While the steps of my novel method have been described generally in chronological order it will be appreciated that certain of the steps may be interchanged without departing from the instant invention.

It will be understood that modifications and variations may be effected without departing from the spirit and scope of the novel concepts of the present invention.

I claim as my invention:

1. In a method of forming a stud-like socket for a curved cylindrical wall such as that of a bomb or the like, the steps of punching a hole in the curved wall, dishing the edge portion defining the hole inwardly of the curved wall, trimming off the inner extremity of the dished portion leaving an annular flange, inserting a combustible plug in said flange in snug telescoping cooperation therewith, applying a flanged cap over the inner end of the plug with its flange defining an internal bore and beam snugly engaged therewith and in alignment with and abutting said dished flange with the plug serving to maintain the bores in alignment, welding the cap to said dished flange to form a socket opening outwardly but closed from the interior of the curved cylindrical wall and destroying said plug by combustion of the same.

2. In a method of forming a socket in a curved cylindrical wall such as that of a bomb and the like, the steps of punching an aperture in the curved wall, depressing a generally circular section about said aperture generally inwardly therefrom, cutting off a portion of said section to form a generally inwardly extending flange terminating in an edge comprising an annular shoulder lying substantially within a flat plane intersecting the interior surface of said wall, aligning and centering a dished cap with respect to said annular shoulder to form a socket opening outwardly but closed from the interior of the curved cylindrical wall, utilizing a combustible plug to maintain the alignment, securing said annular shoulder and cap together with the cap at the bottom of the socket, combusting and removing said plug, and threading said socket including the interior surface of the cap to receive a hanger socket.

3. In a method of forming a socket on a curved wall such as a curved cylindrical bomb wall, the steps of providing a hole in the wall defined by an inwardly projecting annular flange which flange has an annular uniplanar edge, snugly nesting a curved combustible centering plug with said flange with an end of the plug projecting inwardly of the flange, tightly nesting a flanged cap over said plug end, welding the cap flange edge to the edge of said annular flange thereby forming a socket opening outwardly but closed from the interior of the curved cylindrical wall, destroying by combustion said plug, and threading the internal surface areas of said flange and said flanged cap to provide a drop ring socket.

4. In a method of forming a socket for a curved cylindrical wall such as that of a bomb or the like, the steps of punching a hole in the curved wall, dishing the edge about the hole inwardly of the curved wall to form a generally inwardly extending flange terminating in an angular radially extending lip, removing said lip and welding a cap to said inwardly extending flange to form a socket opening outwardly but closed from the interior of the curved cylindrical wall which socket has a uniform diameter.

5. In a method of forming a socket on a curved wall such as a curved cylindrical bomb wall, the steps of providing a hole in the curved wall defined by an annular flange projecting away from the wall, forming an end of the flange spaced from the wall with an annular uniplanar edge surface, snugly nesting a curved combustible centering plug in said flange with an end projecting beyond the annular uniplanar surface, tightly nesting a flanged cap over said plug end, welding the cap flange edge to the uniplanar edge surface of said annular flange thereby forming a socket opening outwardly but closed from the interior of the curved cylindrical wall which socket has a uniform diameter and destroying by combustion said plug during a stress anneal of the assembled socket.

References Cited in the file of this patent

UNITED STATES PATENTS

| Number | Name | Date |
|---|---|---|
| 691,454 | Dies | Jan. 21, 1902 |
| 993,883 | Schickert | May 30, 1911 |
| 2,031,863 | Snell | Feb. 25, 1936 |
| 2,157,354 | Sherman | May 9, 1939 |
| 2,162,477 | Cox | June 13, 1939 |
| 2,701,833 | Worden | Feb. 8, 1955 |

FOREIGN PATENTS

| Number | Country | Date |
|---|---|---|
| 832,697 | France | July 4, 1938 |